US009502756B2

(12) United States Patent
Takahashi et al.

(10) Patent No.: US 9,502,756 B2
(45) Date of Patent: Nov. 22, 2016

(54) ANTENNA DRIVING DEVICE

(71) Applicant: Rohm Co., Ltd., Kyoto (JP)

(72) Inventors: Naoki Takahashi, Kyoto (JP); Masaki Omi, Kyoto (JP); Muga Imamura, Kyoto (JP); Yohei Okuno, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 7 days.

(21) Appl. No.: 14/488,468

(22) Filed: Sep. 17, 2014

(65) Prior Publication Data

US 2015/0079914 A1    Mar. 19, 2015

(30) Foreign Application Priority Data

Sep. 19, 2013 (JP) ................. 2013-193735
Sep. 19, 2013 (JP) ................. 2013-193738
Mar. 18, 2014 (JP) ................. 2014-055069

(51) Int. Cl.
  *H01Q 11/12* (2006.01)
  *H04B 1/04* (2006.01)
  *H01Q 1/32* (2006.01)

(52) U.S. Cl.
  CPC .......... *H01Q 1/3291* (2013.01); *H01Q 1/3241* (2013.01); *H01Q 1/3283* (2013.01)

(58) Field of Classification Search
  CPC ............. H01Q 1/3241; H01Q 1/3283; H01Q 1/3291; H04B 1/04
  USPC ........................ 455/121, 123, 126, 127.1, 129
  See application file for complete search history.

(56) References Cited

U.S. PATENT DOCUMENTS

| | | | | |
|---|---|---|---|---|
| 6,429,768 B1* | 8/2002 | Flick | ...................... | B60R 25/04 307/10.5 |
| 7,679,433 B1* | 3/2010 | Li | ......................... | H03F 1/0244 330/10 |
| 2008/0024213 A1* | 1/2008 | Magrath | ................. | H03F 1/305 330/96 |
| 2008/0064345 A1* | 3/2008 | Yoshida | ............. | G07C 9/00309 455/127.1 |
| 2008/0116752 A1* | 5/2008 | Kuroda | ............. | G07C 9/00309 307/125 |
| 2009/0017781 A1* | 1/2009 | Fujii | ..................... | B60R 25/406 455/127.1 |
| 2011/0102026 A1 | 5/2011 | Takahashi | | |

(Continued)

FOREIGN PATENT DOCUMENTS

| | | |
|---|---|---|
| JP | 2007-216869 | 8/2007 |
| JP | 2011-120216 | 6/2011 |

*Primary Examiner* — Simon Nguyen
(74) *Attorney, Agent, or Firm* — Fish & Richardson P.C.

(57) ABSTRACT

An antenna driving device includes an antenna driving circuit arranged to generate driving current of a transmission antenna, a power supply circuit arranged to generate an output voltage from an input voltage so as to supply the output voltage to the antenna driving circuit, and a logic circuit arranged to control the antenna driving circuit and the power supply circuit. The power supply circuit has a function of temporarily disabling current feedback control so as to perform voltage feedback control using a reference value just before halting the drive of the transmission antenna when the power supply circuit restarts to drive the transmission antenna, or has a function of performing variable control of a reference value for current feedback control in accordance with a rising edge of the driving current when the power supply circuit restarts to drive the transmission antenna.

13 Claims, 17 Drawing Sheets

(56) References Cited

U.S. PATENT DOCUMENTS

| | | | | |
|---|---|---|---|---|
| 2011/0109387 A1* | 5/2011 | Lee | .................... | H03F 1/0227 330/251 |
| 2011/0298580 A1* | 12/2011 | Nakashima | ............ | B60R 25/24 340/3.1 |
| 2012/0062230 A1* | 3/2012 | Vaughan, Jr. | ...... | G01R 33/3415 324/318 |
| 2013/0084802 A1* | 4/2013 | Clarke | ................. | H04B 5/0025 455/41.1 |
| 2013/0337744 A1* | 12/2013 | Lefley | .................... | H04B 5/00 455/41.1 |
| 2014/0022013 A1* | 1/2014 | Tabata | ................. | H04B 1/0458 330/251 |
| 2015/0155783 A1* | 6/2015 | Li | ......................... | H03F 1/0227 323/271 |

* cited by examiner

FIG. 4

| SPI CMD | SINE WAVE DRVING | PULSE WAVE DRIVING |
|---|---|---|
| 121 | ○ | × |
| 122&123 | × | ○ |
| WAVE FORM | DIN1 ⎍⎍ OUT* ∼∿∿∿∼∿∿∿∼ | DIN1 ⎍⎍ OUT* ⎍⎍⎍⎍ ⎍⎍⎍⎍ |

FIG. 6

| DCON | 1 | 0 |
|------|-----|-----|
| 208  | REF1 | REF0 |
| 209  | Hi-Z | CS* |

ANTENNA DRIVING DEVICE

CROSS-REFERENCE TO RELATED APPLICATIONS

This application is based on the following Japanese Patent Applications, the contents of which are hereby incorporated by reference:

(1) No. 2013-193735 (filed Sep. 19, 2013)
(2) No. 2013-193738 (filed Sep. 19, 2013)
(3) No. 2014-055069 (filed Mar. 18, 2014)

BACKGROUND OF THE INVENTION

1. Field of the Invention

The present invention relates to an antenna driving device.

2. Description of Related Art

Conventionally, in a smart entry system or a tire air pressure monitoring system for a vehicle, a non-contact automatic ticket examination system, and the like, there is used an antenna driving device in which a transmission antenna (an LC antenna or an RLC antenna) is driven at resonance frequency $f(=1/(2\pi\sqrt{LC}))$.

As examples of a conventional technique related to the above description, there are JP-A-2007-216869 and JP-A-2011-120216 (which are respectively referred to as Patent Document 1 and Patent Document 2 in the following description).

Here, in a conventional antenna driving device, one of a sine wave driving method and a pulse wave driving method is usually used as an antenna driving method. However, the sine wave driving method has a problem that power consumption and heat generation are large though harmonic wave noise is hardly generated, while the pulse wave driving method has a problem that harmonic wave noise is easily generated though power consumption and heat generation are small.

Note that Patent Document 1 discloses a vehicle equipment remote control device that can switch between the sine wave driving method and the pulse wave driving method in accordance with an operating situation, but there is room for studying a different method for switching the antenna driving method.

In addition, in the conventional antenna driving device, a radio wave transmission range is determined by amount of driving current flowing in the transmission antenna. Therefore, in order to accurately control the radio wave transmission range, a current feedback control method is effective, in which an output voltage of a power supply circuit (i.e., a supply voltage to an antenna driving circuit) is controlled so that the driving current flowing in the transmission antenna is maintained at a constant value. However, the current feedback control method may cause a restriction in system operation because it needs more time for starting the power supply circuit than a voltage feedback control method in which an output voltage of the power supply circuit is maintained at a constant value.

In addition, in order to secure stability of antenna driving, the conventional antenna driving device continues the output operation of the power supply circuit and the antenna driving circuit not only when the antenna is driven (i.e., the antenna is supplied with power) but also when the antenna is halted (i.e., the antenna is not supplied with power). Therefore, current is consumed not only when the antenna is driven but also when the antenna is halted. However, because it is necessary to operate the smart entry system for a vehicle also when engine is stopped, for example, it is important to reduce current consumption of the antenna driving device mounted in the vehicle as much as possible, so as to reduce consumption of battery energy.

SUMMARY OF THE INVENTION

In view of the problems described above found by inventors of this invention, it is an object of the invention disclosed in this specification to provide an antenna driving device that can reduce current consumption when the antenna is halted while securing stability of antenna driving, and an antenna driving device that can perform appropriate antenna driving in accordance with an operating situation.

In order to achieve the above-mentioned object, an antenna driving device disclosed in this specification includes an antenna driving circuit arranged to generate driving current of a transmission antenna, a power supply circuit arranged to generate an output voltage from an input voltage so as to supply the output voltage to the antenna driving circuit, and a logic circuit arranged to control the antenna driving circuit and the power supply circuit, in which the power supply circuit has a function of temporarily disabling current feedback control so as to perform voltage feedback control using a reference value just before halting the drive of the transmission antenna when the power supply circuit restarts to drive the transmission antenna.

In addition, an antenna driving device disclosed in this specification includes an antenna driving circuit arranged to generate driving current of a transmission antenna, a power supply circuit arranged to generate an output voltage from an input voltage so as to supply the output voltage to the antenna driving circuit, and a logic circuit arranged to control the antenna driving circuit and the power supply circuit, in which the power supply circuit has a function of performing variable control of a reference value for current feedback control in accordance with a rising edge of the driving current when the power supply circuit restarts to drive the transmission antenna.

In addition, an antenna driving device disclosed in this specification includes an antenna driver including a linear amplifier for performing sine wave driving of a transmission antenna and a driver for performing pulse wave driving of the transmission antenna, and a logic circuit arranged to control the antenna driver so that only one of the linear amplifier and the driver is operated.

In addition, an antenna driving device disclosed in this specification includes an antenna driving circuit arranged to generate driving current of a transmission antenna, a power supply circuit arranged to generate an output voltage from an input voltage so as to supply the output voltage to the antenna driving circuit, and a logic circuit arranged to control the antenna driving circuit and the power supply circuit, in which the power supply circuit has a function of switching an output feedback system in accordance with an instruction from the logic circuit so as to perform one of voltage feedback control for maintaining the output voltage at a constant value and current feedback control for maintaining the driving current at a constant value.

Note that other features, elements, steps, advantages, and characteristics of the invention disclosed in this specification will become more apparent from the description of embodiments given below and the attached drawings.

BRIEF DESCRIPTION OF THE DRAWINGS

FIG. 4 is a table for explaining a switching function of an antenna driving method.

FIG. 6 is a table for explaining a switching function of an output feedback system.

DETAILED DESCRIPTION OF THE PREFERRED EMBODIMENTS

<Overall Structure>

Figure 1:
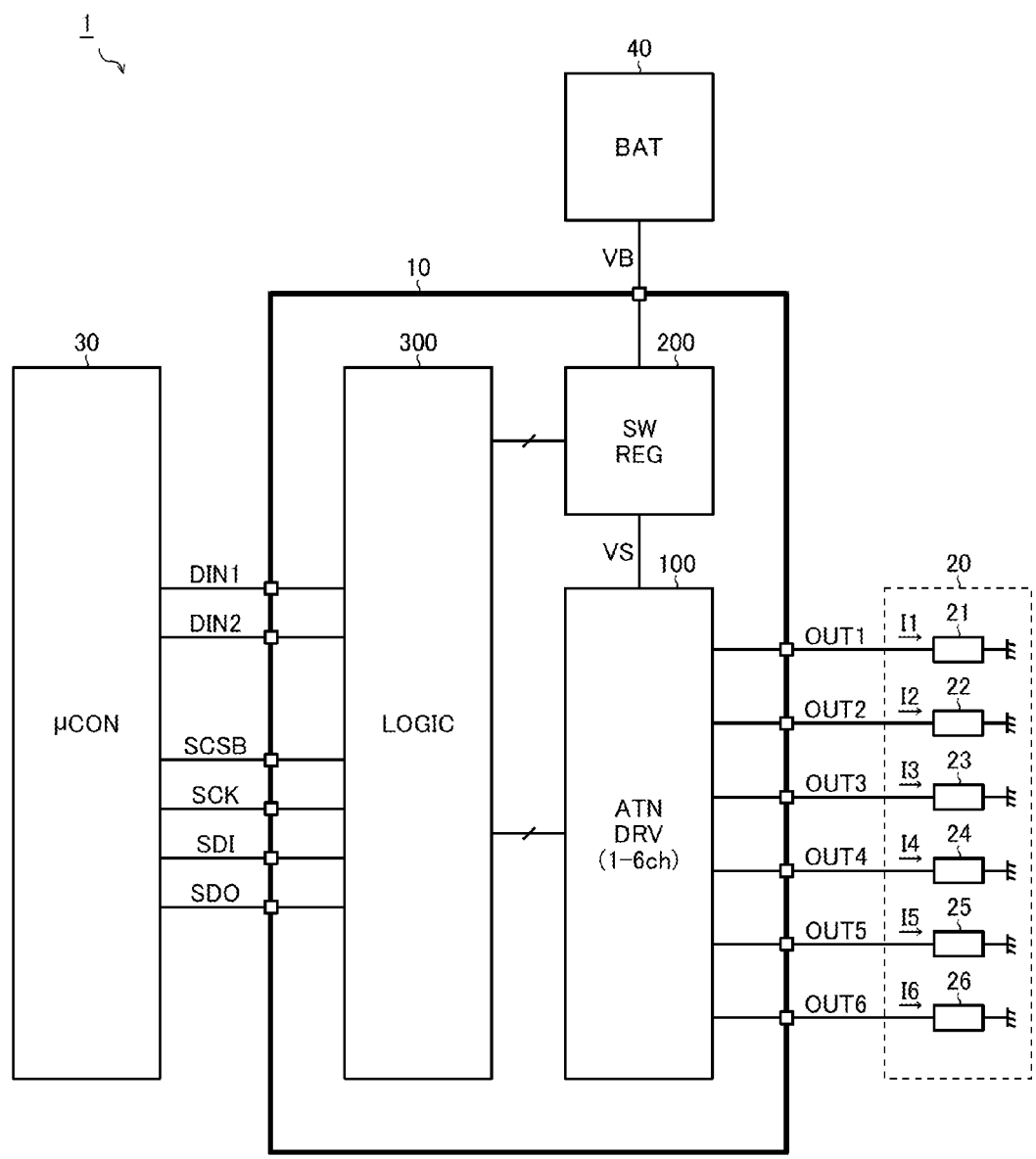
FIG. 1 is a block diagram illustrating an overall structure of a vehicle equipped with an antenna driving device.

FIG. 1 is a block diagram illustrating an overall structure of a vehicle equipped with an antenna driving device. A vehicle 1 of this structural example is equipped with an antenna driving device 10, a transmission antenna unit 20, a microcomputer 30, and a battery 40.

The antenna driving device 10 is a semiconductor integrated circuit device (so-called antenna driver IC) supplied with an input voltage VB (e.g., 12 V) from the battery 40 and operates so as to drive the transmission antenna unit 20 in accordance with an instruction from the microcomputer 30. Note that the antenna driving device 10 includes an antenna driving circuit 100, a switching power supply circuit 200, and a logic circuit 300, which are integrated as main circuits.

The antenna driving circuit 100 is supplied with an output voltage VS (e.g., 20 to 30 V) from the switching power supply circuit 200 and operates, so as to generate driving currents I1 to I6 of the transmission antenna unit 20 in accordance with an instruction from the logic circuit 300. A structure and operation of the antenna driving circuit 100 will be described later in detail.

The switching power supply circuit 200 generates the output voltage VS from the input voltage VB and supplies the output voltage VS to the antenna driving circuit 100. A structure and operation of the switching power supply circuit 200 will be described later in detail.

The logic circuit 300 controls the antenna driving circuit 100 and the switching power supply circuit 200 in accordance with an instruction from the microcomputer 30. Note that the logic circuit 300 receives the instruction from the microcomputer 30 (including various commands) via a serial communication bus (i.e., a four-wire serial peripheral interface (SPI) bus using a chip select signal SCSB, a clock signal SCK, an input data signal SDI, and an output data signal SDO, in this structural example). In addition, the antenna driving device 10 has various data input terminals besides an interface terminal for serial communication. The logic circuit 300 receives transmission data signals DIN1 and DIN2 from the microcomputer 30 without using the above-mentioned serial communication bus.

The transmission antenna unit 20 is a load driven by the antenna driving device 10 and includes six channels of transmission antennas 21 to 26 (such as an LC antenna or an RLC antenna having a resonance frequency f of a low frequency (LF) band (e.g., 125 kHz)). However, the number of channels of the transmission antenna unit 20 is not limited to the above-mentioned number and can be arbitrarily increased or decreased.

The microcomputer 30 is a control main body of the antenna driving device 10 and corresponds to an electronic control unit (ECU), for example.

The battery 40 supplies electric power to individual units of the vehicle 1 (including the antenna driving device 10 and the microcomputer 30). Note that a lead-acid battery or the like can be appropriately used as the battery 40.

Figure 2:
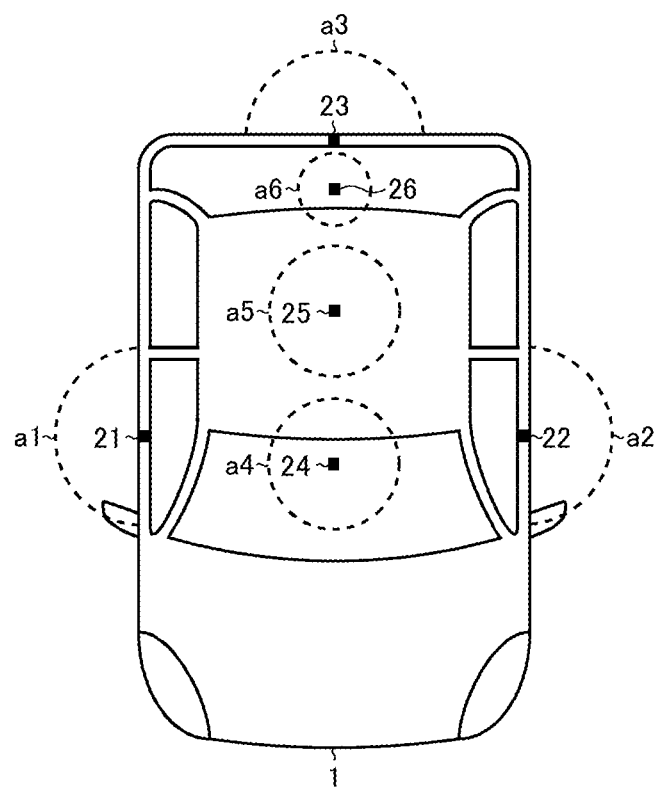
FIG. 2 is a schematic plan view illustrating an example of antenna installation points and radio wave reachable ranges.

FIG. 2 is a schematic plan view illustrating an example of antenna installation points and radio wave reachable ranges. The vehicle 1 of this structural example is equipped with a smart entry system that locks and unlocks a door lock mechanism (not shown) in accordance with success or failure of bidirectional communication with a remote control key (not shown) carried by a driver (or a fellow passenger, and the same hereinafter). The transmission antennas 21 to 26 are disposed as structural elements of the smart entry system (as means for transmitting a request signal to the remote control key) at doors of the vehicle 1 (a driver side door handle, a front passenger side door handle, a trunk door handle) and in a cabin (front, rear, and trunk).

In addition, the vehicle 1 is equipped with a reception antenna for receiving a response signal from the remote control key so as to transmit the same to the microcomputer 30, a touch sensor for detecting a touch of the door handle so as to inform the microcomputer 30 about the touch, a lock button to be pressed for locking the door lock mechanism, and a start button to be pressed for starting an engine or a motor (which are not shown) as other structural elements included in the smart entry system.

For instance, in the vehicle 1 in which the door lock mechanism is locked, when it is detected by the touch sensor that the door handle is touched, the microcomputer 30 controls the antenna driving device 10 to transmit the request signal from the transmission antenna unit 20 to the remote control key. In this case, only the transmission antenna of the door whose door handle is detected to be touched may be driven, or all the transmission antennas 21 to 26 may be driven.

In this case, if the driver carrying the remote control key exists near the vehicle 1 (within the radio wave reachable range of the transmission antenna unit 20), the response signal is sent back from the remote control key that has received the request signal. In contrast, if the driver carrying the remote control key does not exist near the vehicle 1, the response signal is not sent back. Therefore, the microcomputer 30 unlocks the door lock mechanism when the response signal is sent back in a predetermined time after the request signal is transmitted, while the microcomputer 30 maintains the locked state of the door lock mechanism when the response signal is not sent back.

The bidirectional communication with the remote control key (i.e., checking presence or absence of the remote control key) is regularly performed not only when the door lock mechanism is unlocked but also after the door lock mechanism is unlocked, and is also performed appropriately when the vehicle 1 is started and when the door lock mechanism is locked. Known techniques can be used for various operations of the smart entry system, and hence more detailed description is omitted.

Note that as to the transmission antennas 21 to 23 disposed at the doors of the vehicle 1, it is preferred to widen radio wave reachable ranges a1 to a3 to a certain extent in order to securely perform the communication with the remote control key existing outside the vehicle. On the other hand, as to the transmission antennas 24 to 26 disposed in the cabin of the vehicle 1, it is preferred to restrict their radio wave reachable ranges a4 to a6 to the inside of the cabin in order to prevent leakage of radio waves to the outside of the vehicle. The radio wave reachable ranges a1 to a6 can be arbitrarily set by, for example, appropriately setting resistances of resistors Ra1 to Ra6 (see FIG. 3 referred to later) connected in series to the transmission antennas 21 to 26, respectively, and hence by adjusting the driving currents I1 to I6.

<Antenna driving circuit>

Figure 3:
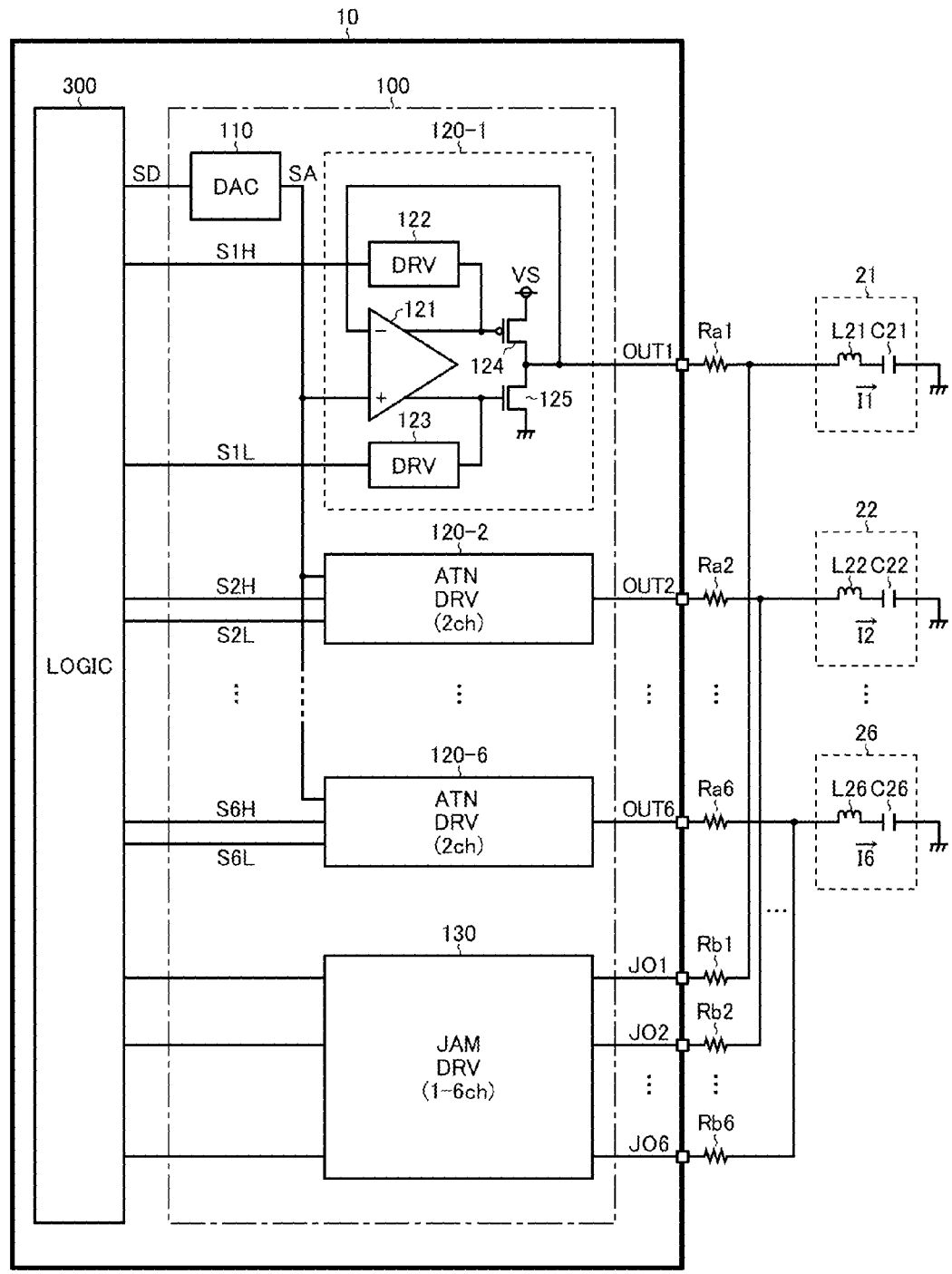
FIG. 3 is a circuit block diagram illustrating a structural example of an antenna driving circuit.

FIG. 3 is a circuit block diagram of a structural example of the antenna driving circuit 100. The antenna driving circuit 100 of this structural example includes a digital-analog converter 110, antenna drivers 120-1 to 120-6, and a jamming driver 130.

The digital-analog converter 110 converts digital sine wave data SD supplied from the logic circuit 300 into an analog sine wave signal SA and output it to each of the antenna drivers 120-1 to 120-6. In this way, the digital-analog converter 110 is disposed commonly for the six channel antenna drivers 120-1 to 120-6 (namely for six channel transmission antennas 21 to 26).

The antenna drivers 120-1 to 120-6 are respectively disposed for the transmission antennas 21 to 26 connected to the antenna driving device 10, and each of them includes a linear amplifier 121, gate drivers 122 and 123, a P-channel metal oxide semiconductor (MOS) field effective transistor 124, and an N-channel MOS field effective transistor 125. Note that an internal structure of only the antenna driver 120-1 is illustrated in FIG. 3, but other antenna drivers 120-2 to 120-6 also have the same internal structure. Hereinafter, for convenience sake of description, the antenna driver 120-1 is focused and described in detail.

The linear amplifier 121 is means for performing the sine wave driving of the transmission antenna 21, and gate voltages of the transistors 124 and 125 are changed linearly so that the sine wave signal SA supplied to a non-inverting input terminal (+) matches an output signal OUT 1 supplied to an inverting input terminal (−). More specifically, the linear amplifier 121 changes gate voltages of the transistors 124 and 125 so that conductivity of the transistor 124 becomes higher while conductivity of the transistor 125 becomes lower as the output signal OUT1 is more lower than the sine wave signal SA. On the contrary, the linear amplifier 121 changes gate voltages of the transistors 124 and 125 so that the conductivity of the transistor 124 becomes lower while the conductivity of the transistor 125 becomes higher as the output signal OUT1 is more higher than the sine wave signal SA.

The gate drivers 122 and 123 are means for performing the pulse wave driving of the transmission antenna 21 and changes gate voltages of the transistors 124 and 125 in a pulsed manner in accordance with pulse wave signals S1H and S1L supplied from the logic circuit 300. More specifically, the gate drivers 122 and 123 set each of gate voltages of the transistors 124 and 125 to be low level so that the transistor 124 is turned on while the transistor 125 is turned off when the output signal OUT1 is made to be high level. On the contrary, the gate drivers 122 and 123 set each of gate voltages of the transistors 124 and 125 to be high level so that the transistor 124 is turned off while the transistor 125 is turned on when the output signal OUT1 is made to be low level.

The transistor 124 is an upper side switch for connecting/disconnecting between an applying terminal of the output signal OUT1 and an applying terminal (first voltage terminal) of the output voltage VS. The source of the transistor 124 is connected to the applying terminal of the output voltage VS. The drain of the transistor 124 is connected to an applying terminal of the output signal OUT1. The gate of the transistor 124 is connected to a first output terminal of the linear amplifier 121 and an output terminal of the gate driver 122.

The transistor 125 is a lower side switch for connecting/disconnecting between the applying terminal of the output signal OUT 1 and a ground terminal (second voltage terminal). The source of the transistor 125 is connected to the ground terminal. The drain of the transistor 125 is connected to the applying terminal of the output signal OUT1. The gate of the transistor 125 is connected to a second output terminal of the linear amplifier 121 and an output terminal of the gate driver 123.

Further, in the outside of the antenna driving device 10, the resistor (Ra1 to Rab) and the transmission antenna (21 to 26) (an LC resonance circuit constituted of a coil (L21 to L26) and a capacitor (C21 to C26)) are connected in series between each of the applying terminals of the output signals OUT1 to OUT6 and the ground terminal. The driving currents I1 to I6 are supplied to the transmission antennas 21 to 26, which are sine-wave driven or pulse-wave driven at resonance frequency $f(=1/(2\pi\sqrt{LC}))$ thereof.

The jamming driver 130 outputs pseudo noise signals JO1 to JO6 supplied from the logic circuit 300 to the transmission antenna in a non-communication state. By disposing this jamming driver 130, even if a radio wave leaks from the transmission antenna in a communication state to the transmission antenna in the non-communication state so that the transmission antenna in the non-communication state outputs unnecessary radio waves, for instance, an intended noise component can be superimposed on the output radio wave. Therefore, it is possible to prevent error communication establishment.

Note that jamming intensity (amplitude of the superimposed noise component) can be arbitrarily set by appropriately selecting a resistance of a resistor (Rb1 to Rb6) connected between the applying terminal of the pseudo noise signal (JO1 to JO6) and the transmission antenna (21 to 26).

In addition, in the antenna driving device 10 of this structural example, it is possible to perform the same jamming operation as described above by using the antenna drivers 120-1 to 120-6 without using the jamming driver 130. Further, when performing the jamming operation, it is possible to arbitrarily set whether to use the jamming driver 130 or to use the antenna drivers 120-1 to 120-6, by a command input to the logic circuit 300.

FIG. 4 is a table for explaining a switching function of the antenna driving method by the logic circuit 300. In the antenna driving device 10 of this structural example, the logic circuit 300 has a function of switching between the sine wave driving and the pulse wave driving of the output signal OUT* (here, "*" indicates one of 1, 2, ..., 6, the same hereinafter) by controlling the antenna drivers 120-1 to 120-6 so as to operate only one of the linear amplifier 121 and the gate drivers 122 and 123 in accordance with an SPI command supplied from the microcomputer 30.

More specifically, when the output signal OUT* is sine-wave driven, the linear amplifier 121 is made to be an operating state (○) while the gate drivers 122 and 123 are made to be a non-operating state (x). Here, each of the gate drivers 122 and 123 becomes a high impedance output state and is disconnected from the gate of the transistor (124 and 125).

On the other hand, when the output signal OUT* is pulse-wave driven, the gate drivers 122 and 123 are made to be the operating state (○) while the linear amplifier 121 is made to be the non-operating state (x). In this case, the linear amplifier 121 becomes the high impedance output state and is disconnected from the gates of the transistors 124 and 125.

With this structure, an appropriate antenna driving can be performed in accordance with operating situations of the transmission antennas 21 to 26. For instance, before unlocking the vehicle 1 (before a driver enter the vehicle), it is not necessary to consider an influence of a harmonic wave noise that is generated when the antenna is driven and is given to vehicle equipment or the like. Therefore, in this operating situation, it is possible to put priority on reduction of power consumption and heat generation by the pulse wave driving of the transmission antennas 21 to 26.

On the other hand, after unlocking the vehicle 1 (after the driver enters the vehicle), the influence of the harmonic wave noise, which is generated when the antenna is driven and is given to vehicle equipment or the like, cannot be ignored. Therefore, in this operating situation, it is possible to put priority on reduction of the harmonic wave noise rather than the sine wave driving of the transmission antennas 21 to 26.

In addition, the logic circuit 300 also has a function of controlling the antenna drivers 120-1 to 120-6 so that the transmission antennas 21 to 26 are driven simultaneously or in a time-sharing manner. For instance, when the transmission antennas 21 to 26 are pulse-wave driven, heat generation due to the antenna driving can be suppressed. Therefore, it is possible to drive multiple channels simultaneously. On the other hand, when the transmission antennas 21 to 26 are sine-wave driven, heat generation due to the antenna driving becomes large. Therefore, it is preferred to drive only one channel or to drive multiple channels sequentially in a time-sharing manner.

Note that the logic circuit 300 outputs the sine wave data SD or pulse wave signals S*H and S*L when the transmission data signal DIN1 supplied from the microcomputer 30 is high level, and stops output of the sine wave data SD and the pulse wave signals S*H and S*L when the transmission data signal DIN1 is low level. Therefore, the output signal OUT* is sine-wave driven or pulse-wave driven at the resonance frequency f of the transmission antennas 21 to 26 only when the transmission data signal DIN1 is high level.

However, when the transmission antennas 21 to 26 are pulse-wave driven, it is possible to supply the transmission data signal DIN2 that is pulse-wave driven at the resonance frequency f of the transmission antennas 21 to 26 from the microcomputer 30 to the logic circuit 300, and to output the transmission data signal DIN2 as the pulse wave signals S*H and S*L from the logic circuit 300 to the transmission antennas 21 to 26 as through-output. Note that it is possible to arbitrarily set one of the transmission data signals DIN1 and DIN2 to be used, by a command input to the logic circuit 300.

<Switching Power Supply Circuit (First Structural Example)>

Figure 5:
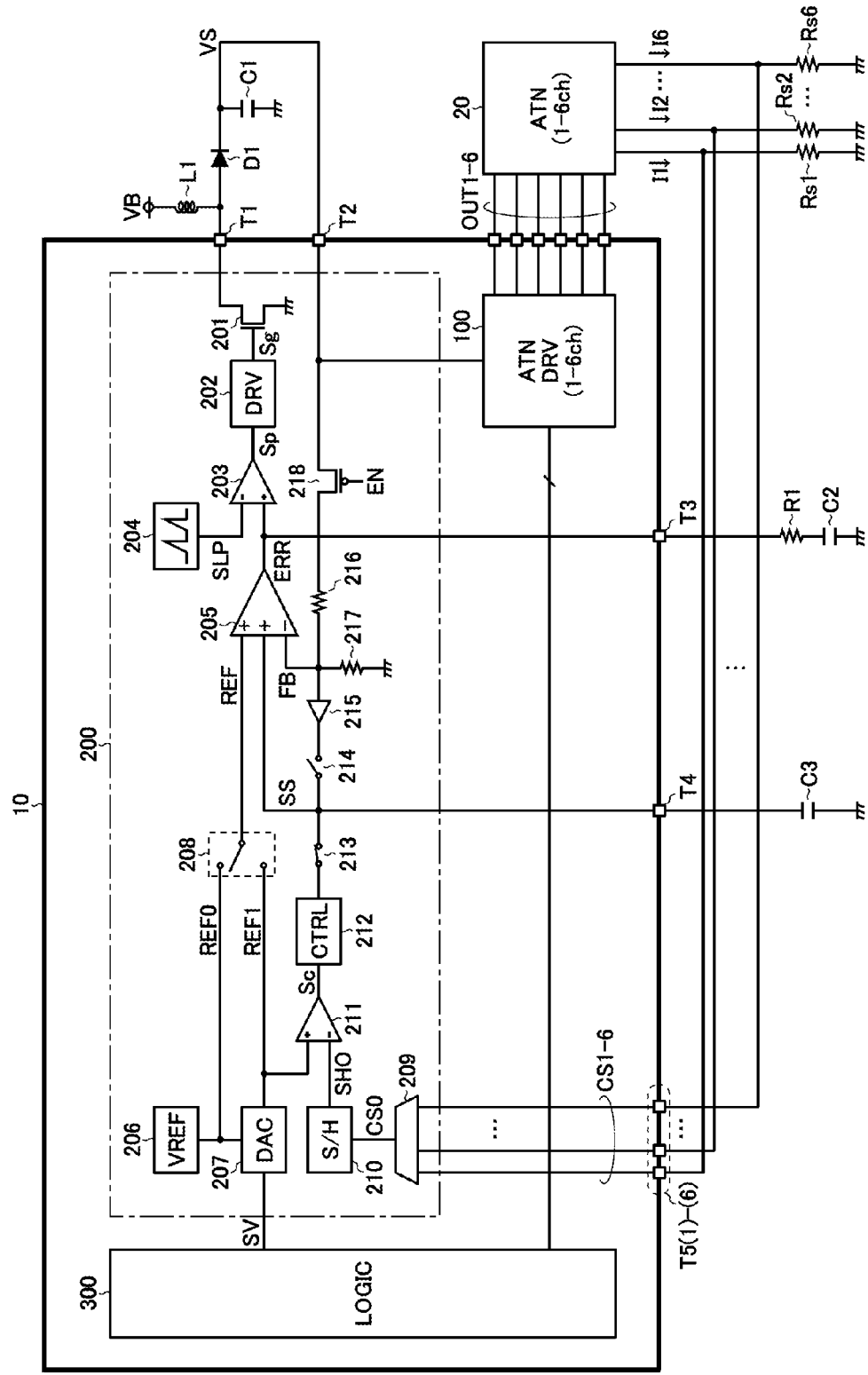
FIG. 5 is a circuit block diagram illustrating a first structural example of a switching power supply circuit.

FIG. 5 is a circuit block diagram illustrating a first structural example of the switching power supply circuit 200. The switching power supply circuit 200 of this structural example is a step-up type DC/DC converter for stepping up the input voltage VB so as to generate the output voltage VS. The antenna driving device 10 is equipped with external terminals T1 to T4 and T5(1) to T5(6) for establishing electric connection between the switching power supply circuit 200 and the outside of the device. A coil L1, capacitors C1 to C3, a diode D1, and resistors R1 and Rs1 to Rs6 are connected externally as discrete elements constituting the switching power supply circuit 200.

In the outside of the antenna driving device 10, the external terminal T1 is connected to a first end of the coil L1 and the anode of the diode D1. A second end of the coil L1 is connected to an applying terminal of the input voltage VB. The cathode of the diode D1 is connected to a first end of the capacitor C1. A second end of the capacitor C1 is connected to the ground terminal. The external terminal T2 is connected to a first end of the capacitor C1 (corresponding to the applying terminal of the output voltage VS). The resistor R1 and the capacitor C2 for phase compensation are connected in series between the external terminal T3 and the ground terminal. The capacitor C3 for soft start is connected between the external terminal T4 and the ground terminal. The resistors Rs1 to Rs6 for sensing current, which respectively generate current feedback signals CS1 to CS6 (voltage signals) corresponding to the driving currents I1 to I6, are connected between the transmission antenna unit 20 and the ground terminal. The external terminals T5(1) to T5(6) are respectively connected to applying terminals of high potential ends of the resistors Rs1 to Rs6 (corresponding to the current feedback signals CS1 to CS6).

In addition, the switching power supply circuit 200 includes semiconductor devices and semiconductor circuit units integrated in the antenna driving device 10, which includes an N-channel MOS field effective transistor 201, a gate driver 202, a PWM comparator 203, a slope signal generator 204, an error amplifier 205, a reference voltage generator 206, a digital-analog converter 207, a selector 208, a multiplexer 209, a sample-hold unit 210, a comparator 211, a charge/discharge control unit 212, analog switches 213 and 214, a buffer 215, resistors 216 and 217, and a P-channel MOS field effective transistor 218. Note that the switching power supply circuit 200 may include an abnormal protection circuit or the like as necessary, besides the circuit units described above.

The transistor 201 forms a switching drive stage driven in accordance with a switching drive signal Sg, together with the coil L1, the diode D1, and the capacitor C1. The drain of the transistor 201 is connected to the external terminal T1. The source of the transistor 201 is connected to the ground terminal. The gate of the transistor 201 is connected to the output terminal of the gate driver 202.

The gate driver 202 generates the switching drive signal Sg with enhanced current capacity of a PWM signal Sp and outputs the switching drive signal Sg to the gate of the transistor 201.

The PWM comparator 203 generates the PWM signal Sp by comparing an error signal ERR applied to the non-inverting input terminal (+) with a slope signal SLP applied to the inverting input terminal (−). The PWM signal Sp becomes high level when the error signal ERR is higher than the slope signal SLP and becomes low level when the error signal ERR is lower than the slope signal SLP.

The slope signal generator 204 generates the slope signal SLP of a triangle wave (or sawtooth wave). The slope signal generator 204 can arbitrarily set an oscillation frequency (switching frequency) of the slope signal SLP in accordance with an instruction from the logic circuit 300.

Note that each of the transistor 201, the gate driver 202, the PWM comparator 203, and the slope signal generator 204 described above functions as one structural element of the output voltage generator for generating the output voltage VS from the input voltage VB in accordance with the error signal ERR.

The error amplifier 205 generates the error signal ERR corresponding to a difference between a feedback voltage FB applied to the inverting input terminal (−) and a lower voltage between a reference voltage REF and a soft start voltage SS applied to two non-inverting input terminals (+). Note that the resistor R1 and the capacitor C2 for phase compensation are connected via the external terminal T3 to the output terminal of the error amplifier 205.

The reference voltage generator 206 generates a predetermined reference voltage REF0 (e.g., 1.28 V).

The digital-analog converter 207 is operated by receiving the reference voltage REF0, so as to convert digital reference voltage data SV supplied from the logic circuit 300 into an analog reference voltage REF1 (e.g., 40 mV to 1 V).

The selector 208 selects one of the reference voltages REF0 and REF1 in accordance with an instruction from the logic circuit 300 and outputs the same as the reference voltage REF.

The multiplexer 209 selects one of the current feedback signals CS1 to CS6 obtained for the individual transmission antennas 21 to 26 in accordance with an instruction from the logic circuit 300, and outputs the same as a current feedback signal CS0 to the sample-hold unit 210.

The sample-hold unit 210 sample-holds a peak value (highest value) of the current feedback signal CS0 in accordance with an instruction from the logic circuit 300 so as to generate a peak signal SHO. Note that hold timing of the current feedback signal CS0 should be a predetermined time (e.g., 2 μs) after a zero cross of the current feedback signal CS0, for example.

The comparator 211 generates a charge/discharge control signal Sc by comparing the reference voltage REF1 applied to the non-inverting input terminal (+) with the peak signal SHO applied to the inverting input terminal (−). The charge/discharge control signal Sc becomes low level when the peak signal SHO is higher than the reference voltage REF1 and becomes high level when the peak signal SHO is lower than the reference voltage REF1.

The charge/discharge control unit 212 charges and discharges the capacitor C3 in accordance with the charge/discharge control signal Sc so as to generate the soft start voltage SS. More specifically, the charge/discharge control unit 212 charges the capacitor C3 when the charge/discharge control signal Sc is high level so as to raise the soft start voltage SS. On the contrary, when the charge/discharge control signal Sc is low level, the charge/discharge control unit 212 discharges the capacitor C3 so as to drop the soft start voltage SS.

The analog switch 213 functions as a first switch for connecting and disconnecting between the charge/discharge control unit 212 and the capacitor C3 in accordance with an instruction from the logic circuit 300.

The analog switch 214 functions as a second switch for connecting and disconnecting between the output terminal of the buffer 215 (corresponding to an applying terminal of the feedback voltage FB) and the capacitor C3 in accordance with an instruction from the logic circuit 300.

The buffer 215 buffers the feedback voltage FB and outputs the same to a next stage.

The resistors 216 and 217 are connected in series between the external terminal T2 (corresponding to the applying terminal of the output voltage VS) and the ground terminal, so as to divide the output voltage VS by a predetermined dividing ratio α (e.g., α=1/40), and hence the feedback voltage FB (e.g., 225 mV to 1 V) is generated. Note that a connection node between the resistor 216 and the resistor 217 is connected to input terminals of the error amplifier 205 and the buffer 215, as the applying terminal of the feedback voltage FB.

The transistor 218 functions as a third switch for connecting and disconnecting between the external terminal T2 and the resistor 216 in accordance with an enable signal EN of the antenna driving device 10. The transistor 218 is turned on when the enable signal EN is low level (that is a logical level for making the antenna driving device 10 be in the operating state), and is turned off when the enable signal EN is high level (that is a logical level for making the antenna driving device 10 be in the non-operating state). With this structure, when the antenna driving device 10 is in the non-operating state, a current path from the applying terminal of the input voltage VB to the ground terminal via the coil L1, the diode D1, the external terminal T2, the transistor 218, and the resistors 216 and 217 can be cut off. Therefore, it is possible to reduce standby current of the antenna driving device 10.

Note that the resistors 216 and 217 described above function as structural elements of a first voltage generator for generating a first voltage (the feedback voltage FB) corresponding to the output voltage VS.

In addition, the reference voltage generator 206, the digital-analog converter 207, the multiplexer 209, the sample-hold unit 210, the comparator 211, and the charge/discharge control unit 212, which are described above, function as structural elements of a second voltage generator for generating a second voltage (the soft start voltage SS) corresponding to a result of comparison between a peak value of driving current I* and the reference value.

There is described a basic operation (for generating the output voltage VS) of the switching power supply circuit 200 having the above-mentioned structure. When the transistor 201 is turned on, switching current to the ground terminal flows in the coil L1 via the transistor 201 so that electric energy is stored in the coil L1. In this case, a potential at the external terminal T1 is dropped to the ground potential via the transistor 201. Therefore, the diode D1 becomes a reverse bias state, and hence current does not flow from the capacitor C1 to the transistor 201. On the other hand, when the transistor 201 is turned off, a reverse voltage generated in the coil L1 causes discharge of the stored electric energy. In this case, because the diode D1 is in a forward bias state, current flowing via the diode D1 charges the capacitor C1. The above-mentioned operation is repeated, and hence the input voltage VB is stepped up so that the output voltage VS is generated at the external terminal T2.

Next, an output feedback control of the switching power supply circuit 200 is described. The switching power supply circuit 200 has a function of switching the output feedback system in accordance with an instruction from the logic circuit 300 so as to perform one of the voltage feedback control for maintaining the output voltage VS at a constant value and the current feedback control for maintaining the driving currents I1 to I6 at a constant value.

When the switching power supply circuit 200 switches the output feedback system, the logic circuit 300 refers to a register value DCON set by the microcomputer 30 and controls the switching power supply circuit 200 to perform the voltage feedback control when DCON=1 holds, and to perform the current feedback control when DCON=0 holds.

Figure 6:
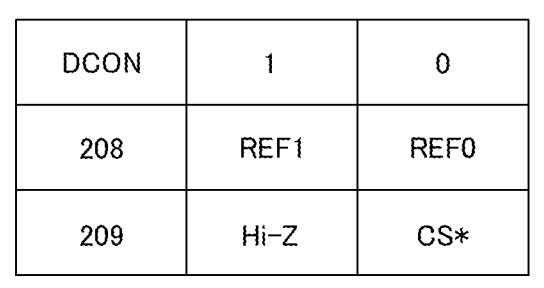

FIG. 6 is a table for explaining the function of switching the output feedback system, showing operating states of the selector 208 and the multiplexer 209 corresponding to the register value DCON.

In the voltage feedback control (DCON=1), the multiplexer 209 becomes a high impedance output state. In this case, because a peak value of the current feedback signal CS0 is not detected in the sample-hold unit 210, the peak signal SHO is always lower than the reference voltage REF1, and the charge/discharge control signal Sc is always high level (that is a logical level in a charging state). Therefore, because the capacitor C3 is always maintained in a charged state regardless of variations of the driving currents I1 to I6, the soft start voltage SS is gradually raised after the antenna driving device 10 starts and is finally maintained at a voltage higher than the reference voltage REF1.

In addition, in the voltage feedback control (DCON=1), the selector 208 selects and outputs the reference voltage REF1. Therefore, after the antenna driving device 10 is started, when a predetermined soft start period T1 (e.g., 500 μs) elapses so that the soft start voltage SS becomes higher than the reference voltage REF1, the error amplifier 205 generates the error signal ERR corresponding to a difference between the reference voltage REF1 and the feedback voltage FB, and the output voltage generator (201 to 204) in the following stage performs PWM driving (i.e., duty control) of the transistor 201 in accordance with the error signal ERR. By the formation of this output feedback loop, the switching power supply circuit 200 maintains the output voltage VS at a constant value corresponding to the reference voltage REF1.

On the other hand, in the current feedback control (DCON=0), the multiplexer 209 selects and outputs one of the current feedback signals CS1 to CS6 as the current feedback signal CS0. In this case, the peak signal SHO generated in the sample-hold unit 210 varies in accordance with a peak value of the current feedback signal CS0 (as well as a peak value of the driving current I* to be monitored). Therefore, a logical level of the charge/discharge control signal Sc (i.e., a charge/discharge state of the capacitor C3) is switched in accordance with whether or not the peak signal SHO is higher than the reference voltage REF1.

More specifically, when the driving current I* to be monitored is smaller than a target value and the peak signal SHO is lower than the reference voltage REF1, the charge/discharge control signal Sc becomes high level so that the capacitor C3 becomes the charged state. Therefore, the soft start voltage SS is raised. On the contrary, when the driving current I* to be monitored is larger than a target value and the peak signal SHO is higher than the reference voltage REF1, the charge/discharge control signal Sc becomes low level so that the capacitor C3 becomes a discharged state. Therefore, the soft start voltage SS is dropped.

In this way, in the current feedback control (DCON=0), the soft start voltage SS is variable controlled in accordance with the driving current I* to be monitored.

In addition, in the current feedback control (DCON=0), the selector 208 selects and outputs the reference voltage REF0. Note that the reference voltage REF0 is set to a voltage higher than the upper limit value in variation of the soft start voltage SS. Therefore, the error amplifier 205 always generates the error signal ERR in accordance with a difference between the soft start voltage SS and the feedback voltage FB, and the output voltage generator (201 to 204) in the following stage performs the PWM driving (i.e., the duty control) of the transistor 201 in accordance with this error signal ERR. By the formation of this output feedback loop, the switching power supply circuit 200 performs variable control of the output voltage VS so that the driving current I* to be monitored is maintained at a constant value in accordance with the reference voltage REF1.

Note that the radio wave transmission ranges of the transmission antennas 21 to 26 are determined by amplitudes of the driving currents I1 to I6. Therefore, by adjusting the reference voltage REF1 to be compared with the peak signal SHO, the radio wave transmission ranges of the transmission antennas 21 to 26 can be arbitrarily set.

As described above, the switching power supply circuit 200 of this structural example has the function of switching the output feedback system in accordance with an instruction from the logic circuit 300 so as to perform one of the voltage feedback control for maintaining the output voltage VS at a constant value and the current feedback control for maintaining the driving currents I1 to I6 at a constant value. With this structure, an appropriate output feedback system can be selected in accordance with operating situation of the transmission antennas 21 to 26 (such as transmission frequency or transmission interval of the radio wave) or a system specification.

For instance, in startup of the antenna driving device 10, it is possible to put priority on shortening the startup time by switching the switching power supply circuit 200 to the voltage feedback control method. On the other hand, after completion of startup of the antenna driving device 10, it is possible to put priority on improving accuracy of the radio wave transmission range by switching the switching power supply circuit 200 to the current feedback control method.

Further, the switching power supply circuit 200 of this structural example is configured to perform variable control of the soft start voltage SS in the current feedback control (DCON=0), but the target of the variable control is not limited to this. It is possible to configure to perform variable control of the reference voltage REF and the feedback voltage FB in accordance with the driving current I*.

Figure 7:
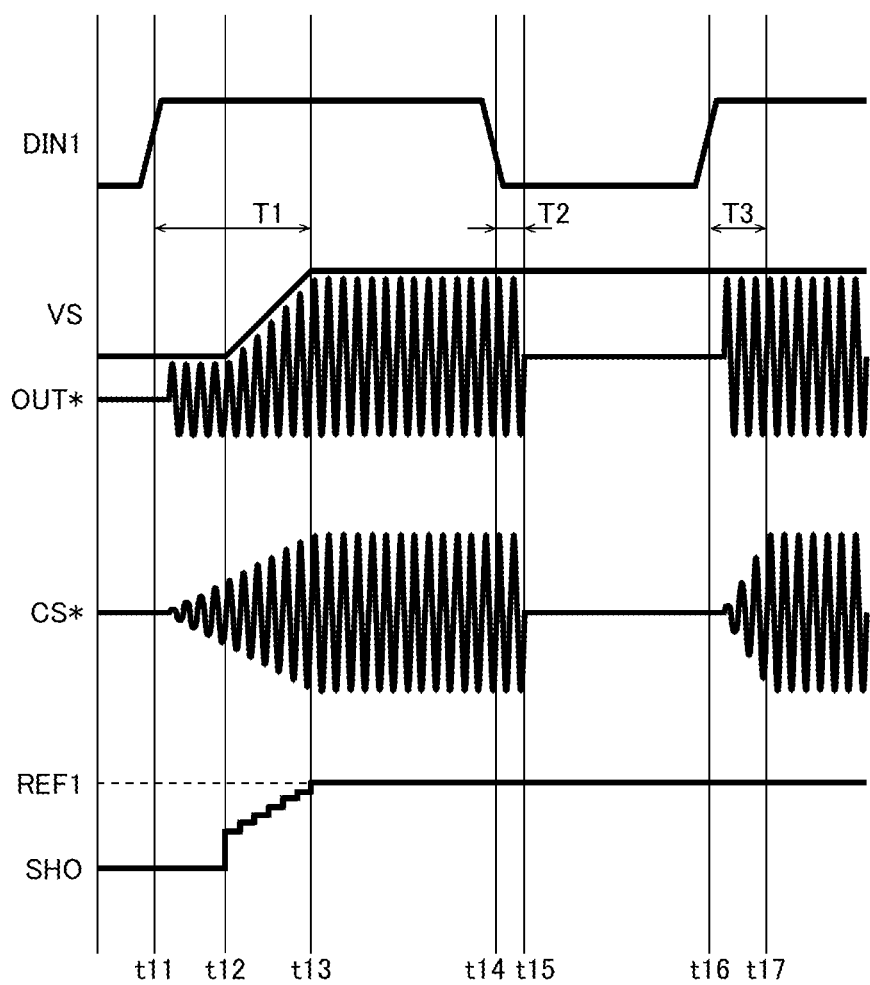
FIG. 7 is a timing chart showing an operational example of the switching power supply circuit.

FIG. 7 is a timing chart showing one operational example of the switching power supply circuit 200 (in the current feedback control). In order from above, there are shown the transmission data signal DIN1, the output voltage VS, the output signal OUT*, the current feedback signal CS*, and the peak signal SHO.

As shown in this chart, during a high level period of the transmission data signal DIN1, the output signal OUT* is sine-wave driven (or pulse-wave driven) at the resonance frequency f of the transmission antennas 21 to 26, and hence the radio wave is output. On the other hand, during a low level period of the transmission data signal DIN1, the output signal OUT* is in a non-driven state so that output of the radio wave is stopped. Therefore, the transmission data signal DIN1 is switched between high level and low level so that the radio wave output is turned on and off. Thus, it is possible to transmit data to the remote control key.

Further, after starting the antenna driving device 10, when the transmission data signal DIN1 is raised to high level for the first time at time point t11, the soft start operation of the switching power supply circuit 200 is performed so that the output voltage VS is gradually raised in the soft start period T1 (from time point t11 to time point t13). In this case, peak values of the output signal OUT* and the current feedback signal CS* are increased gradually along with the increase of the output voltage VS. Note that a sample-hold operation of the current feedback signal CS* is started in the soft start period T1 (at time point t12).

When the transmission data signal DIN1 is dropped to low level at time point t14, the sine wave driving of the output signal OUT* is stopped so that a value of the current feedback signal CS* becomes zero. Here, it is preferred that a drive stopping period T2 (from time point t14 to time point t15) necessary from the dropping of the transmission data signal DIN1 to low level until the sine wave driving of the output signal OUT* is stopped should be as shorter as possible (e.g., 16 µs at longest).

Note that during a low level period of the transmission data signal DIN1, the analog switch 213 is turned off so that the charge/discharge control of the capacitor C3 by the charge/discharge control unit 212 is inhibited. With this structure, the soft start voltage SS can be maintained in the state just before being turned off until the transmission data signal DIN1 is raised to high level next time. Therefore, it is possible to maintain the output voltage VS at a target value.

When the transmission data signal DIN is raised to high level again at time point t16, the sine wave driving of the output signal OUT* is resumed, and the analog switch 213 is turned on so that the charge/discharge control (current feedback control) of the capacitor C3 by the charge/discharge control unit 212 is resumed. Note that a peak stabilizing period T3 (from time point t16 to time point t17) necessary after the transmission data signal DIN1 is raised to high level until the peak value of the current feedback signal CS* is stabilized becomes shorter than the soft start period T1 described above.

Figure 8:
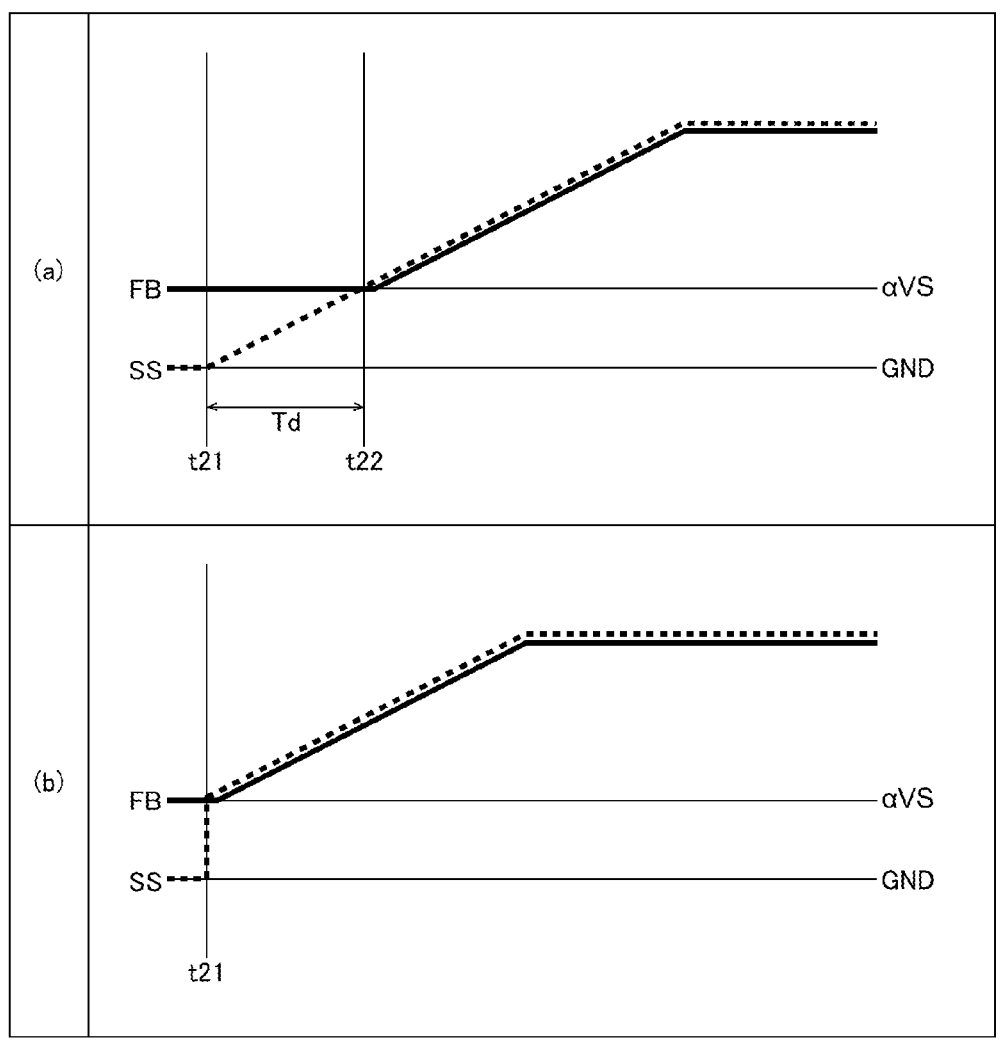
FIG. 8 is a timing chart for explaining an initial raising function of a soft start voltage.

FIG. 8 is a timing chart for explaining an initial raising function of the soft start voltage SS using the analog switch 214, and illustrates behaviors of the feedback voltage FB (see a solid line) and the soft start voltage SS (see a broken line). Note that section (a) illustrates the behaviors in case without the initial raising function while section (b) illustrates the behaviors in case with the initial raising function.

The initial raising function of the soft start voltage SS means a function of turning on the analog switch 214 for a short period in startup of the antenna driving device 10 to short-circuit between an applying terminal of the soft start voltage SS and the applying terminal of the feedback voltage FB, so that the soft start voltage SS is rapidly raised to the same voltage as the feedback voltage FB.

In the step-up type switching power supply circuit 200, the output voltage VS that is close to the input voltage VB is output even if the switching operation is not started, and hence an initial value of the feedback voltage FB ($=\alpha \times VS$) supplied to the error amplifier 205 is not zero.

As illustrated in section (a), in case without the initial raising function of the soft start voltage SS, the soft start voltage SS is gradually raised from zero (GND) after the antenna driving device 10 is started at time point t21. However, the error signal ERR sticks to low level until the soft start voltage SS exceeds the feedback voltage FB, and hence the switching drive of the transistor 201 is not started. After that, when the soft start voltage SS exceeds the feedback voltage FB at time point t22, the switching drive of the transistor 201 is finally started so that the output voltage VS (as well as the feedback voltage FB) starts to rise gradually following the soft start voltage SS. In this way, in case of without the initial raising function of the soft start voltage SS, startup of the switching power supply circuit 200 is delayed by a period Td (from time point t21 to time point t22).

On the other hand, as illustrated in section (b), in case with the initial raising function of the soft start voltage SS, the analog switch 214 is turned on for only a short period when the antenna driving device 10 is started at time point t21 so that the soft start voltage SS is rapidly raised to the same voltage as the feedback voltage FB. Therefore, the output voltage VS (as well as the feedback voltage FB) starts to rise gradually following the soft start voltage SS just after the antenna driving device 10 is started. Therefore, it is possible to resolve the delay of starting the switching power supply circuit 200.

<Switching Power Supply Circuit (Second Structural Example)>

Figure 9:
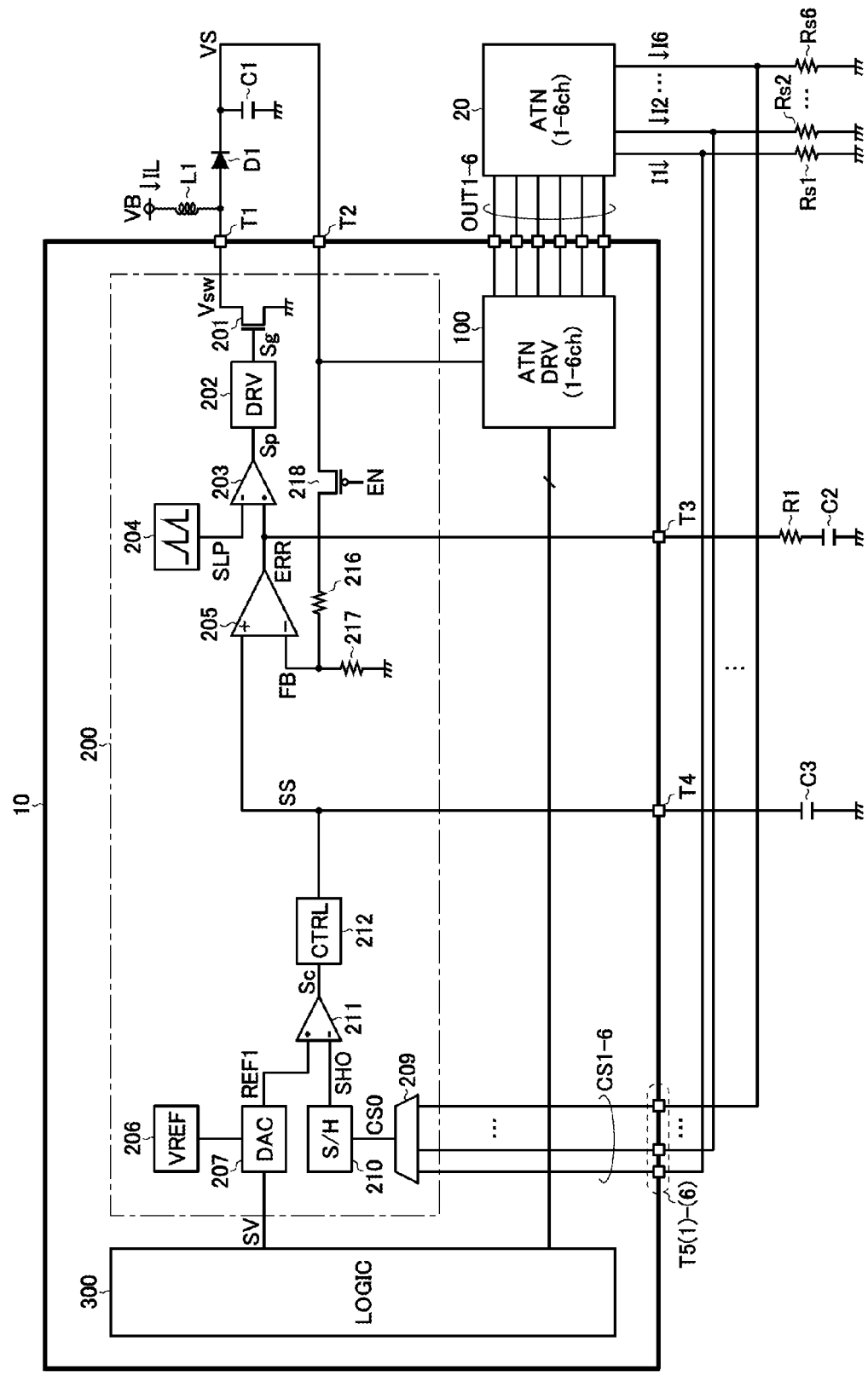
FIG. 9 is a circuit block diagram illustrating a second structural example of the switching power supply.

FIG. 9 is a circuit block diagram illustrating a second structural example of the switching power supply circuit 200. The switching power supply circuit 200 of this structural example is basically the same as the first structural example (FIG. 5), but the selector 208, the analog switches 213 and 214, and the buffer 215 are eliminated.

In other words, the switching power supply circuit 200 of this structural example has a structure in which the function of switching the output feedback system, the function of maintaining the soft start voltage SS, and the function of short-circuiting between the feedback voltage FB and the soft start voltage SS are eliminated from the first structural example described above.

In the above description, it is assumed that in order to perform intermittent drive of the transmission antenna unit 20 at a stable and communicable speed, the output operation of the switching power supply circuit 200 and the antenna driving circuit 100 is continued not only when the antenna is driven (when power is supplied to the transmission antenna unit 20) but also when the antenna is halted (when power is not supplied to the transmission antenna unit 20). However, in this control, current is consumed not only when the antenna is driven but also when the antenna is halted. Therefore, there is a room for further improvement.

Figure 10:
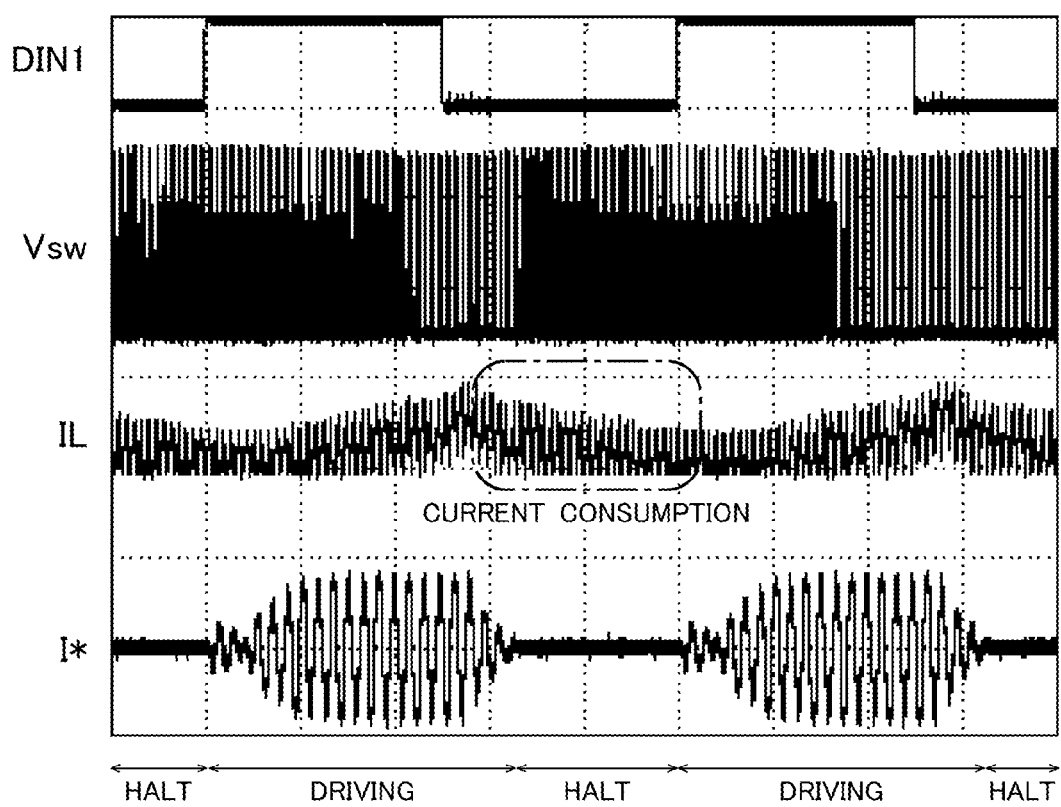
FIG. 10 is a timing chart showing current consumption when the antenna is halted.

FIG. 10 is a timing chart indicating current consumption when the antenna is halted. In order from above, there are shown the transmission data signal DIN1, a switch voltage Vsw, coil current IL, and the driving current I*. The switch voltage Vsw is a rectangular (pulse) wave voltage appearing at the external terminal T1, and the coil current IL is current flowing in the coil L1. As apparent from this chart, in the intermittent drive of the transmission antenna unit 20, the coil current IL flows not only when the antenna is driven but also when the antenna is halted.

Note that in order to realize lower current consumption when the antenna is halted, the output operation of the switching power supply circuit 200 and the antenna driving circuit 100 should be stopped when the antenna is halted. However, as a trade-off for that, stability when the antenna is driven again is impaired, and hence it is necessary to review the output feedback control. In the following description, the reason of that is described in detail.

Figure 11:
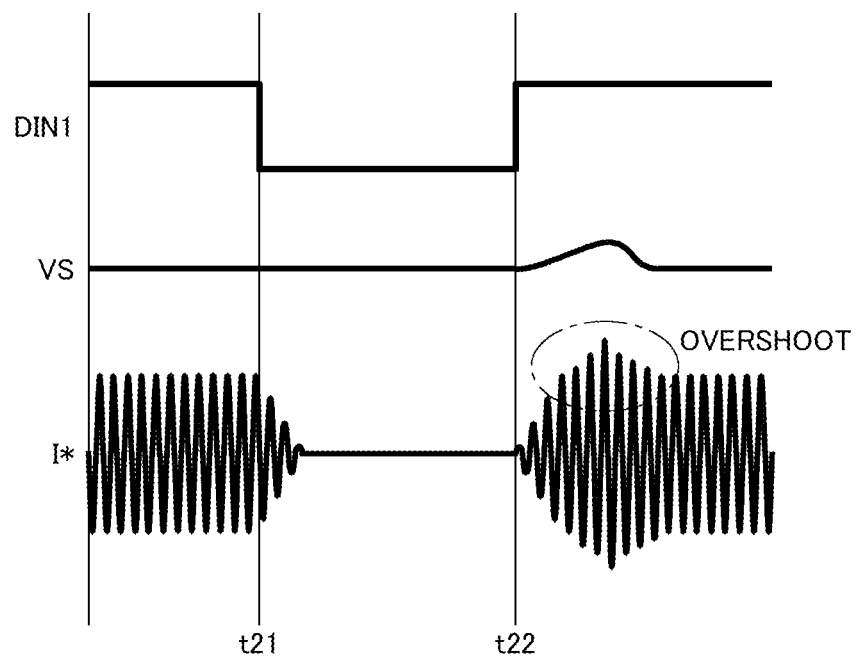
FIG. 11 is a timing chart showing an overshoot when the antenna is driven again.

FIG. 11 is a timing chart showing overshoot of the driving current I* when the antenna is driven again. In order from above, there are shown the transmission data signal DIN1, the output voltage VS, and the driving current I*.

In the antenna halt period (from time point t21 to time point t22) in which the transmission data signal DIN1 is low level, when the logic circuit 300 stops the output operation of the switching power supply circuit 200 and the antenna driving circuit 100, the driving current I* does not flow in the transmission antenna unit 20. On the other hand, the output voltage VS stored in the capacitor C1 is maintained at a voltage just before the antenna is halted because a discharge path via the antenna driving circuit 100 is cut off.

When the transmission data signal DIN1 is raised to high level at time point t22, the logic circuit 300 receives the transmission data signal DIN1 and restarts the output operation of the switching power supply circuit 200 and the antenna driving circuit 100. However, because the transmission antenna unit 20 is an LC load, it takes longer time to raise the driving current I* than an R load or an L load. If the current feedback control is performed in accordance with the slowly rising driving current I*, the output voltage VS rises unnecessarily so that an overshoot may occur in the driving current I*.

Figure 12:
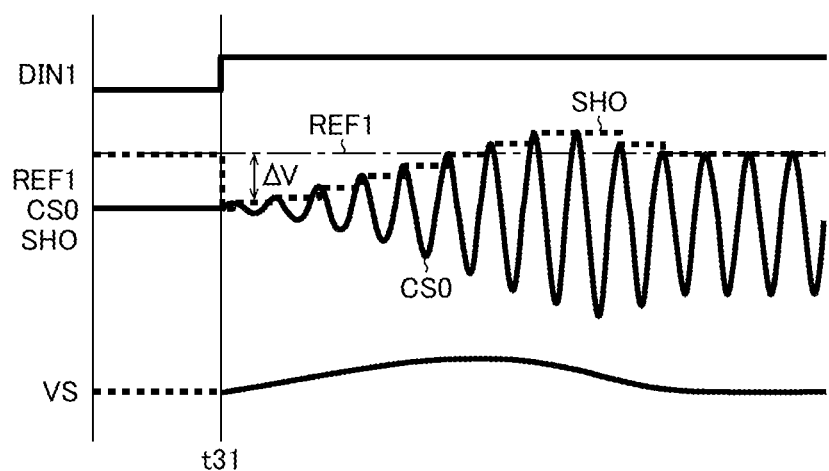
FIG. 12 is a timing chart for explaining a generation principle of the overshoot.

FIG. 12 is a timing chart for explaining a principle of overshoot generation. In order from above, there are shown the transmission data signal DIN1, the reference voltage REF1, the current feedback signal CS0, the peak signal SHO, and the output voltage VS.

As shown in this chart, when the transmission data signal DIN1 is raised to high level at time point t31, so that the logic circuit 300 receives the transmission data signal DIN1 and restarts the output operation of the switching power supply circuit 200 and the antenna driving circuit 100, the current feedback signal CS0 is gradually raised from zero. Therefore, there is generated a potential difference $\Delta V$ between the peak signal SHO and the reference voltage REF1. Therefore, because the current feedback control is performed so that the driving current I* is increased by the potential difference $\Delta V$, the output voltage VS is unnecessarily raised. As a result, there occurs an overshoot of the driving current I*.

Figure 13:
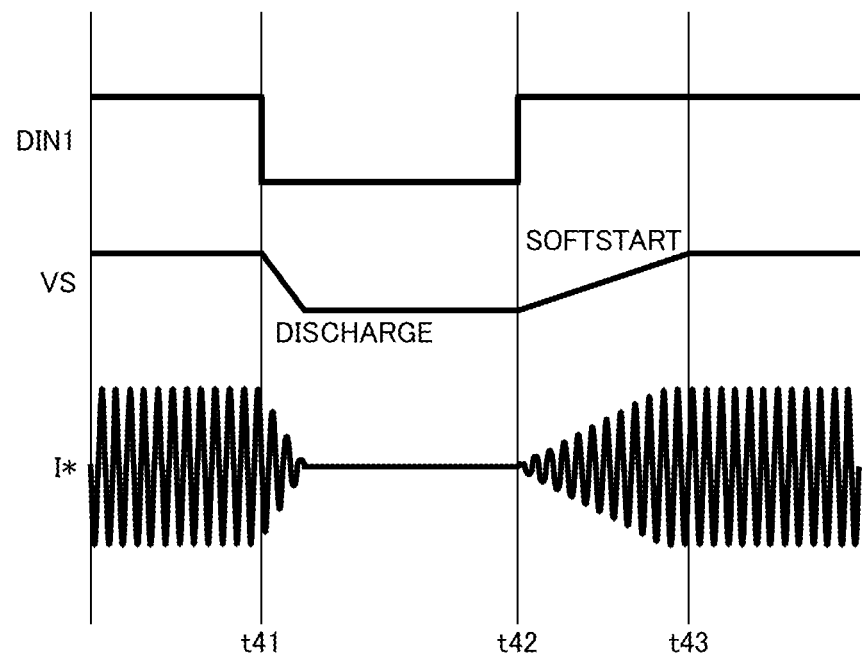
FIG. 13 is a timing chart showing a first improvement measure of the overshoot.

FIG. 13 is a timing chart showing a first improvement measure for the overshoot. In order from above, there are shown the transmission data signal DIN1, the output voltage VS, and the driving current I*.

In the first improvement measure of this chart, when the transmission data signal DIN1 is dropped to low level at time point t41, the output voltage VS is temporarily discharged. As a result, when the transmission data signal DIN1 is raised to high level again at time point t42, soft start of the output voltage VS is performed again. Therefore, it is possible to resolve the overshoot of the driving current I* (see time point t42 to time point t43).

In other words, in the first improvement measure, the soft start of the output voltage VS is repeated every time when the transmission antenna unit 20 is driven again not only in the initial start (power on) of the antenna driving device 10 but also during the intermittent drive of the transmission antenna unit 20. However, in this structure, the output voltage VS and the driving current I* should be raised again in a long time every time when the transmission antenna unit 20 is driven again. Therefore, the first improvement measure may not satisfy communication speed determined in system specification, and there is remaining room for further study.

Figure 14:
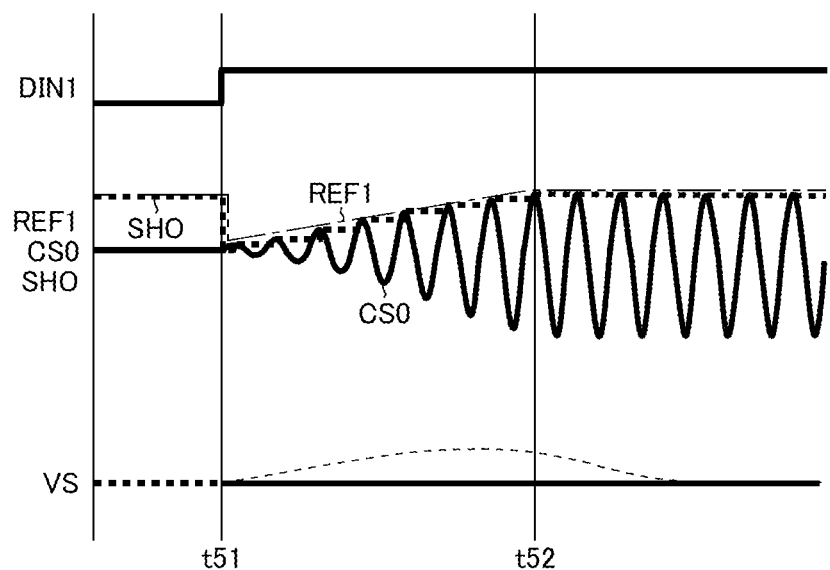
FIG. 14 is a timing chart showing a second improvement measure of the overshoot.

FIG. 14 is a timing chart showing a second improvement measure for the overshoot. In order from above, there are shown the transmission data signal DIN1, the reference voltage REF1, the current feedback signal CS0, the peak signal SHO, and the output voltage VS.

In the second improvement measure of this chart, when the transmission data signal DIN1 is raised to high level at time point t51, the logic circuit 300 receives the transmission data signal DIN1 and restarts the output operation of the switching power supply circuit 200 and the antenna driving circuit 100. Further, the logic circuit 300 performs variable control of the reference voltage data SV so that the reference voltage REF1 is gradually raised in accordance with rising of the driving current I* (and with rising of the peak signal SHO) (see time point t51 to time point t52). With this structure, the potential difference between the reference voltage REF1 and the peak signal SHO is eliminated, and hence it is possible to resolve the overshoot of the driving current I*.

However, a rising behavior of the driving current I* varies widely in accordance with characteristics of the transmission antenna unit 20. Therefore, when the second improvement measure described above is adopted, it is necessary to restrict the transmission antenna unit 20 in advance, which can be connected to be driven, or it is necessary to receive an external input of the reference voltage data SV that is optimized for the transmission antenna unit 20 connected to be driven.

<Switching Power Supply Circuit (Third Structural Example)>

Figure 15:
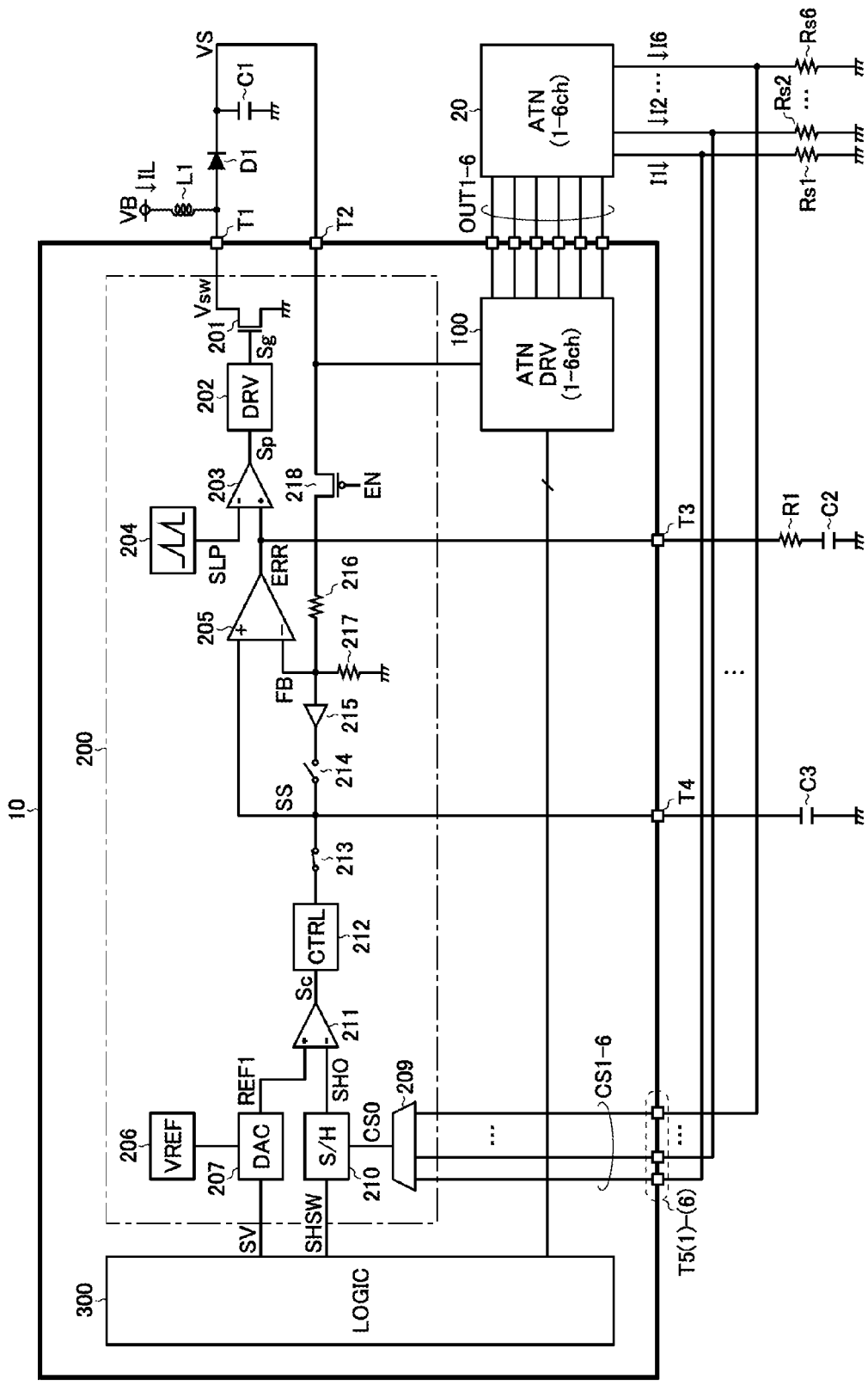
FIG. 15 is a circuit block diagram illustrating a third structural example of the switching power supply circuit.

FIG. 15 is a circuit block diagram illustrating a third structural example of the switching power supply circuit 200. The switching power supply circuit 200 of this structural example is basically the same as the second structural example (FIG. 9), but the analog switches 213 and 214, and the buffer 215 of the first structural example (FIG. 5) are added.

Specifically, the switching power supply circuit 200 of this structural example has a structure in which the function of maintaining the soft start voltage SS and the function of short-circuiting between the feedback voltage FB and the soft start voltage SS are added to the second structural example described above. In other words, the switching power supply circuit 200 of this structural example can also be said to have a structure in which only the function of switching the output feedback system is eliminated from the first structural example described above.

Note that in the switching power supply circuit 200 of the third structural example, the analog switch 213 for connecting/disconnecting between the charge/discharge control unit 212 and the capacitor C3 functions as a structural element of a voltage maintaining unit for maintaining the soft start voltage SS in accordance with an instruction from the logic circuit 300. In addition, the analog switch 214 for connecting/disconnecting between the applying terminal of the feedback voltage FB and the capacitor C3 functions as a structural element of a voltage short-circuit unit for short-circuiting between the feedback voltage FB and the soft start voltage SS in accordance with an instruction from the logic circuit 300.

In addition, FIG. 15 shows a sample-hold switching signal SHSW for switching the sample-hold unit 210 to one of an input sampling state and an output holding state. The sample-hold switching signal SHSW appears first time in FIG. 15, but actually, it is a signal existing also in the first structural example (FIG. 5) and the second structural example (FIG. 9).

Figure 16:
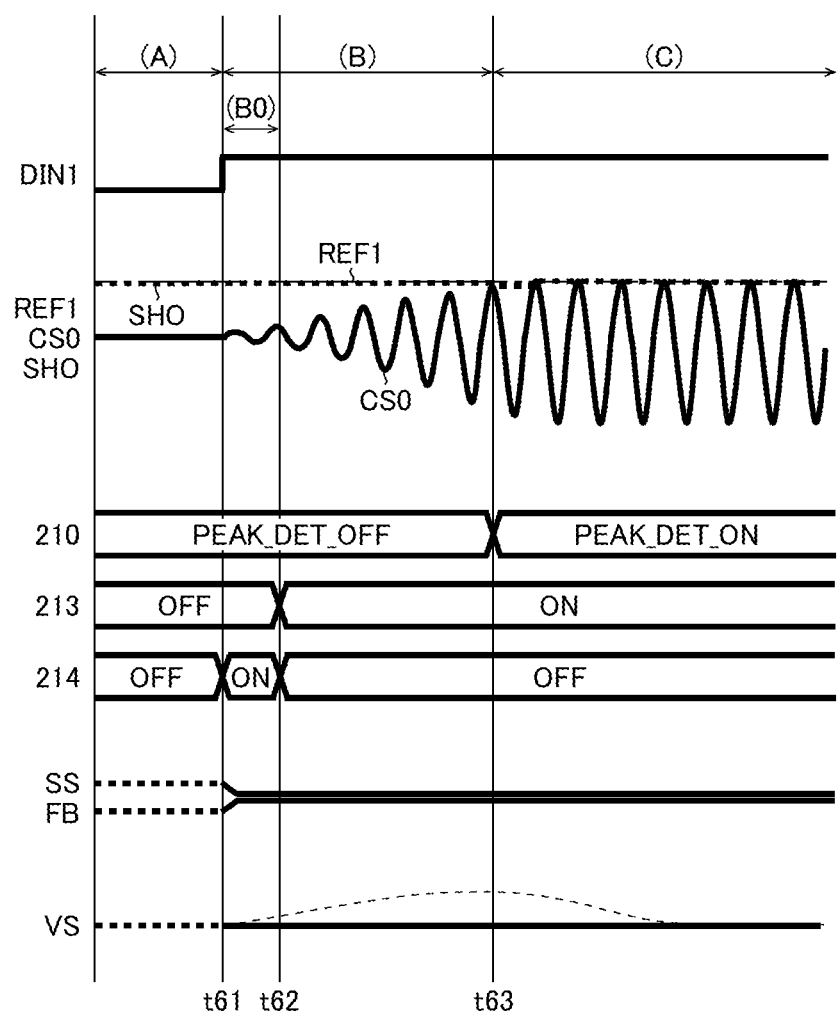
FIG. 16 is a timing chart showing a switch switching operation when the antenna is driven again.

FIG. 16 is a timing chart showing a switch switching operation when the antenna is driven again. In order from above, there are shown the transmission data signal DIN1, the reference voltage REF1, the current feedback signal CS0, the peak signal SHO, an ON/OFF state of peak value detecting operation by the sample-hold unit 210, ON/OFF states of the analog switches 213 and 214, the soft start voltage SS, the feedback voltage FB, and the output voltage VS.

Before an antenna halt period A in which the transmission data signal DIN1 is low level (before time point t61), the logic circuit 300 stops the output operation of the switching power supply circuit 200 and the antenna driving circuit 100. Therefore, the driving current I* does not flow in the transmission antenna unit 20 so that a value of the current feedback signal CS0 is zero. On the other hand, the output voltage VS stored in the capacitor C1 (as well as the feedback voltage FB as a divided voltage of the output voltage VS) is substantially maintained at the voltage just before the antenna is halted because the discharge path via the antenna driving circuit 100 is cut off.

In addition, in the antenna halt period A, the analog switch 213 is turned off so that the charge/discharge control of the capacitor C3 by the charge/discharge control unit 212 is inhibited (see also time point t15 to time point t16 in FIG. 7 referred to in the above description). With this structure, the soft start voltage SS is maintained in the state just before being turned off after the transmission data signal DIN1 is dropped to low level until the transmission data signal DIN1 is raised to high level next time. In addition, In the antenna halt period A, the analog switch 214 is turned off, and there is no short circuit between the feedback voltage FB and the soft start voltage SS. This switching control of the analog switches 213 and 214 is the same as the first structural example described above. In addition, in the antenna halt period A, the sample-hold switching signal SHSW is fixed to the logical level in the output holding state. Therefore, because the peak value detecting operation of the current feedback signal CS0 by the sample-hold unit 210 is turned off, the peak signal SHO is maintained in the state just before being turned off.

Note that in the antenna halt period A, the soft start voltage SS, the feedback voltage FB, and the output voltage VS are substantially maintained at the voltages just before the antenna is halted, but there is no assurance that they are completely maintained at the voltages. Therefore, they are shown by broken lines in FIG. 16.

At time point t61, the transmission data signal DIN1 is raised to high level, and the logic circuit 300 receiving the transmission data signal DIN1 restarts the output operation of the switching power supply circuit 200 and the antenna driving circuit 100. Then, the current feedback signal CS0 starts to rise gradually from zero.

Therefore, if the current feedback control corresponding to the current feedback signal CS0 is performed just after restarting the drive of the transmission antenna unit 20 at time point t61, the current feedback control is performed so that the driving current I* is increased. As a result, the output voltage VS is unnecessarily raised so that an overshoot of the driving current I* occurs.

On the other hand, in the switching power supply circuit 200 of the third structural example, the logic circuit 300 restarts the drive of the transmission antenna unit 20, the analog switch 213 is turned off while maintaining the off state of the peak value detecting operation by the sample-hold unit 210 (maintaining the peak signal SHO). Thus, the output operation of the switching power supply circuit 200 and the antenna driving circuit 100 is restarted. After that, the logic circuit 300 turns on the peak value detecting operation by the sample-hold unit 210 at time point when a predetermined voltage maintaining period B (from time point t61 to time point t63) elapses, and hence the maintaining of the peak signal SHO is released.

In other words, in the voltage maintaining period B from time point t61 to time point t63, the voltage feedback control based on the soft start voltage SS corresponding to the peak signal SHO just before being turned off is performed without performing the current feedback control corresponding to the current feedback signal CS0 on the way of raising. On the other hand, in a normal drive period C after time point t63, the peak value detecting operation of the current feedback signal CS0 by the sample-hold unit 210 is restarted, the current feedback control is performed in accordance with the current feedback signal CS0 after the raising is completed.

Figure 17:
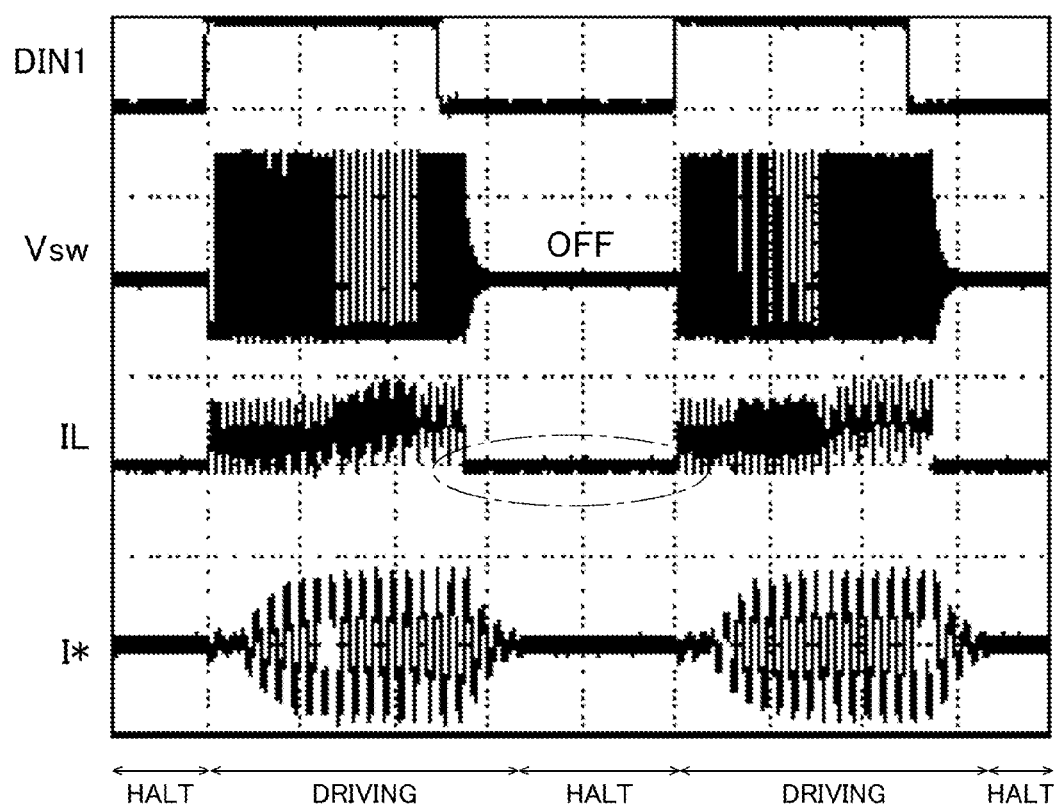
FIG. 17 is a timing chart showing an effect of reducing current consumption when the antenna is halted.

In this way, the switching power supply circuit 200 of the third structural example has a function of temporarily disabling the current feedback control when restarting the drive of the transmission antenna unit 20, so as to perform the voltage feedback control using the reference value just before stopping the drive of the transmission antenna unit 20 (the soft start voltage SS corresponding to the peak signal SHO just before being turned off). Therefore, even if the output operation of the switching power supply circuit 200 and the antenna driving circuit 100 is stopped in the antenna halt period A, an overshoot when the antenna is driven again can be released. Therefore, it is possible to largely reduce the current consumption when the antenna is halted (by approximately 90%) while securing stability of antenna driving (see FIG. 17).

In particular, it is important to suppress consumption of the battery 40 as much as possible in the vehicle 1 equipped with a smart entry system that operates also when the engine is stopped. Therefore, it can be said that the third structural example described above is very useful because it can largely reduce current consumption of the switching power supply circuit 200.

Note that the logic circuit 300 has a function of variable control of the voltage maintaining period B within a predetermined range (a few tens μs to a few hundreds μs) in accordance with an instruction from outside of the device. With this structure, because the voltage maintaining period B can be optimized for each transmission antenna to be driven, it is possible to achieve both securing stability of antenna driving and reduction of current consumption without depending on characteristics of the transmission antenna.

In addition, when the logic circuit 300 restarts to drive the transmission antenna unit 20, the logic circuit 300 turns on the analog switch 214 while turning off the analog switch 213 in a short-circuit period B0 from time point t61 to time point t62 (e.g., a few μs to a few tens μs), so as to short-circuit between the feedback voltage FB and the soft start voltage SS. With this structure, even if there is a potential difference between the feedback voltage FB and the soft start voltage SS in the antenna halt period A, the potential difference can be eliminated just after starting the voltage maintaining period B. Therefore, it is possible to perform the voltage feedback control more stably in the voltage maintaining period B.

Note that because the switching power supply circuit 200 of the first structural example (FIG. 5) includes the analog switches 213 and 214, it is possible to reduce the current consumption when the antenna is halted while securing the stability of antenna driving by performing the same switch switching control as described above.

<Other Variations>

Note that the antenna driving device used for a smart entry system of a vehicle is exemplified for description in the embodiment described above, but the application of the present invention is not limited to this. The present invention can also be widely applied to antenna driving devices used for other applications.

For instance, when the present invention is applied to an antenna driving device used for a tire air pressure monitoring system of a vehicle, the transmission antenna described above is disposed not at the door or in the cabin of the vehicle but at a tire or a wheel.

In addition, various technical features disclosed in this specification can be modified variously within the scope of not deviating from the spirit of the technical invention besides the embodiment described above. For instance, a bipolar transistor and an MOS field effective transistor can be replaced with each other, and logical levels of the various signals can be arbitrarily inverted. In other words, the embodiment described above is an example in every aspect and should not be interrupted as a limitation. The technical scope of the present invention is defined not by the above description of the embodiment but by the claims, which should be understand to include all modifications within meanings and scope equivalent to the claims.

INDUSTRIAL APPLICABILITY

The antenna driving device disclosed in this specification can be used for a smart entry system, a tire air pressure monitoring system, a non-contact automatic ticket examination system, and the like, for example.

LIST OF REFERENCE NUMERALS 1 vehicle
10 antenna driving device
20 transmission antenna unit
21 to 26 transmission antenna
30 microcomputer
40 battery
100 antenna driving circuit
110 digital-analog converter
120-1 to 120-6 antenna driver
121 linear amplifier
122, 123 gate driver
124 P-channel MOS field effective transistor
125 N-channel MOS field effective transistor
130 jamming driver
200 switching power supply circuit
201 N-channel MOS field effective transistor
202 gate driver
203 comparator
204 slope signal generator
205 error amplifier
206 reference voltage generator
207 digital-analog converter
208 selector
209 multiplexer
210 sample-hold unit
211 comparator
212 charge/discharge control unit
213, 214 analog switch
215 buffer
216, 217 resistor
218 P-channel MOS field effective transistor
300 logic circuit
a1 to a6 radio wave reachable range
L1, L21 to L26 coil
C1 to C3, C21 to C26 capacitor
R1, Ra1 to Rab, Rb1 to Rb6, Rs1 to Rs6 resistor
D1 diode
T1 to T4, T5(1) to (6) external terminal

What is claimed is:

1. An antenna driving device comprising:
   an antenna driver including a linear amplifier for sine wave driving of a transmission antenna and a driver for pulse wave driving of the transmission antenna; and
   a logic circuit operable to control the antenna driver to switch between the linear amplifier to drive the transmission antenna with a frequency and the driver to drive the transmission antenna with the same frequency.

2. An antenna driving device according to claim 1, wherein the antenna driver further includes an upper side switch connected between a first voltage terminal and an output terminal connected to the transmission antenna, and a lower side switch connected between a second voltage terminal and the output terminal, and
   the upper side switch and the lower side switch operable to be switched between being driven by the linear amplifier with a sine wave signal and being driven by the drivers with a pulse wave signal.

3. The antenna driving device according to claim 2, further comprising a digital-analog converter arranged to convert digital sine wave data to the analog sine wave signal.

4. The antenna driving device according to claim 3, wherein the antenna driver is disposed for each of a plurality of transmission antennas.

5. The antenna driving device according to claim 4, wherein the digital-analog converter is disposed commonly for the plurality of transmission antennas.

6. The antenna driving device according to claim 5, wherein the logic circuit controls the antenna driver so that the plurality of transmission antennas are driven simultaneously or in a time-sharing manner.

7. The antenna driving device according to claim 1, further comprising a jamming driver arranged to apply an intended noise signal to the transmission antenna in a non-transmission state.

8. A vehicle comprising:
   the antenna driving device according to claim 1;
   a transmission antenna driven by the antenna driving device;
   a microcomputer for controlling the antenna driving device, and
   a battery for supplying power to the antenna driving device.

9. A vehicle according to claim 8, wherein the transmission antennas are disposed at a door and in a cabin as structural elements of a smart entry system.

10. A vehicle according to claim 8, wherein the transmission antenna is disposed at a tire or a wheel as a structural element of a tire air pressure monitoring system.

11. The antenna driving device according to claim 1, wherein the driver is operable to become a high impedance output state when the logic circuit switches to the linear amplifier to drive the transmission antenna, and
   wherein the linear amplifier is operable to become a high impedance output state when the logic circuit switches to the driver to drive the transmission antenna.

12. The antenna driving device according to claim 1, wherein the logic circuit is operable to control the antenna driver switching between the linear amplifier to drive the transmission antenna with a frequency and the driver to drive the transmission antenna with the same frequency, which is by a command input signal.

13. The antenna driving device according to claim 6, wherein the logic circuit is operable to switch the antenna driver to drive the plurality of transmission antennas between simultaneously when the transmission antennas are pulse-wave driven and in a time-sharing manner when the transmission antennas are sine-wave driven.

\* \* \* \* \*